US008514286B2

(12) United States Patent
Kuwata et al.

(10) Patent No.: US 8,514,286 B2
(45) Date of Patent: Aug. 20, 2013

(54) IMAGE TRANSMISSION APPARATUS AND IMAGE RECEPTION APPARATUS

(75) Inventors: Hiromi Kuwata, Chiba (JP); Nobuhiro Hayashi, Tokyo (JP); Atsushi Ohori, Kawasaki (JP)

(73) Assignee: Nikon Corporation, Tokyo (JP)

( * ) Notice: Subject to any disclaimer, the term of this patent is extended or adjusted under 35 U.S.C. 154(b) by 749 days.

(21) Appl. No.: 12/385,696

(22) Filed: Apr. 16, 2009

(65) Prior Publication Data

US 2009/0262201 A1    Oct. 22, 2009

(30) Foreign Application Priority Data

Apr. 18, 2008   (JP) ................................. 2008-108838
Feb. 26, 2009   (JP) ................................. 2009-044308

(51) Int. Cl.
*H04N 5/225*    (2006.01)
(52) U.S. Cl.
USPC ..................................................... 348/207.1
(58) Field of Classification Search
USPC ................. 348/207.1, 207.11, 207.2, 211.99, 348/211.1, 211.2, 211.3
See application file for complete search history.

(56) References Cited

U.S. PATENT DOCUMENTS

| 2002/0021359 | A1 | 2/2002 | Okamoto |
| 2002/0158970 | A1 | 10/2002 | Takeshi |
| 2003/0011683 | A1 | 1/2003 | Yamasaki et al. |
| 2003/0012566 | A1 | 1/2003 | Kindaichi |
| 2003/0095196 | A1 | 5/2003 | Misawa |
| 2003/0214670 | A1 | 11/2003 | Ohmura |
| 2004/0263629 | A1* | 12/2004 | Ambiru et al. ............. 348/207.1 |
| 2005/0128321 | A1* | 6/2005 | Koide ....................... 348/231.99 |
| 2005/0283356 | A1* | 12/2005 | Wang ................................ 704/2 |
| 2007/0109419 | A1 | 5/2007 | Takeshi |
| 2007/0109420 | A1 | 5/2007 | Takeshi |
| 2008/0122950 | A1* | 5/2008 | Uchiyama ................ 348/231.99 |

FOREIGN PATENT DOCUMENTS

| EP | 1 686 452 A2 | 8/2006 |
| JP | A-09-168129 | 6/1997 |
| JP | A-11-027627 | 1/1999 |
| JP | A-2001-223866 | 8/2001 |
| JP | A-2001-285689 | 10/2001 |
| JP | A-2001-346150 | 12/2001 |
| JP | A-2002-330324 | 11/2002 |
| JP | A-2002-330328 | 11/2002 |
| JP | A-2003-158704 | 5/2003 |
| JP | A-2006-080860 | 3/2006 |
| JP | A-2006-174060 | 6/2006 |
| JP | B2-3858360 | 12/2006 |

OTHER PUBLICATIONS

Oct. 9, 2009 Search Report issued in European Patent Application No. EP 09 15 8110.8.
Apr. 23, 2013 Office Action issued in Japanese Patent Application No. 2009-044308 (with Translation).

* cited by examiner

*Primary Examiner* — Yogesh Aggarwal
(74) *Attorney, Agent, or Firm* — Oliff & Berridge, PLC

(57) ABSTRACT

An image transmission apparatus includes: a deletion unit that deletes an image file recorded in a storage medium; an identifying unit that identifies an image file booked for transmission by an external image reception apparatus; a prohibiting unit that prohibits the deletion unit from deleting the image file recorded in the storage medium, which has been identified by the identifying unit; and a transmission control unit that reads the image file recorded in the storage medium, which has been identified by the identifying unit, and transmits the image file to the image reception apparatus.

7 Claims, 10 Drawing Sheets

IMAGE TRANSMISSION APPARATUS AND IMAGE RECEPTION APPARATUS

INCORPORATION BY REFERENCE

The disclosures of the following priority applications are herein incorporated by reference: Japanese Patent Application No. 2008-108838 filed Apr. 18, 2008 and Japanese Patent Application No. 2009-044308 filed Feb. 26, 2009.

BACKGROUND OF THE INVENTION

1. Field of the Invention

The present invention relates to an image transmission apparatus and an image reception apparatus.

2. Description of Related Art

The camera disclosed in Japanese Laid Open Patent Publication No. 2006-80860 transmits a requested image file to a host device in response to an image file transmission request issued from the host device.

SUMMARY OF THE INVENTION

However, in the camera in the related art, if the image file is deleted from a storage medium in the camera before the image file transmission executed in response to the image file transmission request issued from the host device is completed, the image file cannot be transmitted.

According to the first aspect of the invention, an image transmission apparatus comprises: a deletion unit that deletes an image file recorded in a storage medium; an identifying unit that identifies an image file booked for transmission by an external image reception apparatus; a prohibiting unit that prohibits the deletion unit from deleting the image file recorded in the storage medium, which has been identified by the identifying unit; and a transmission control unit that reads the image file recorded in the storage medium, which has been identified by the identifying unit, and transmits the image file to the image reception apparatus.

According to the second aspect of the invention, in the image transmission apparatus according to the first aspect, it is preferred that the image transmission apparatus further comprises: an interface unit via which an external camera is connected to the image transmission apparatus. If available capacity at the storage medium is smaller than a data size of an image file received from the external camera via the interface unit, the deletion unit deletes as many image files that are not delete-prohibited by the prohibiting unit, among image files recorded in the storage medium, as necessary to secure memory space in the storage medium greater than the data size.

According to the third aspect of the invention, in the image transmission apparatus according to the first aspect, it is preferred that the image transmission apparatus further comprises: an image-capturing unit that captures a subject image and obtains image data; and an image file generation unit that generates an image file based upon the image data obtained by the image-capturing unit. If available capacity at the storage medium is smaller than a data size of an image file generated by the image file generation unit, the deletion unit deletes as many image files that are not delete-prohibited by the prohibiting unit, among image files recorded in the storage medium, as necessary to secure memory space in the storage medium equal to or greater than the data size.

According to the fourth aspect of the invention, in the image transmission apparatus according to the first aspect, it is preferred that the prohibiting unit prohibits the deletion unit from deleting an image file for which the image reception apparatus has issued a delete prohibit instruction.

According to the fifth aspect of the invention, in the image transmission apparatus according to the first aspect, it is preferred that the prohibiting unit clears prohibition of deletion by the deletion unit of an image file, transmission of which has been completed by the transmission control unit.

According to the sixth aspect of the invention, in the image transmission apparatus according to the first aspect, it is preferred that the prohibiting unit prohibits the deletion unit from deleting an image file for which a user has issued a delete prohibit instruction.

According to the seventh aspect of the invention, in the image transmission apparatus according to the sixth aspect, it is preferred that if the user issues the delete prohibit instruction by specifying an image, the prohibiting unit prohibits the deletion unit from deleting an image file that corresponds to the image specified by the user.

According to the eighth aspect of the invention, in the image transmission apparatus according to the first aspect, it is preferred that the image transmission apparatus further comprises: a detection unit that detects an image file transmission disabled state with regard to image file transmission to the image reception apparatus. As the detection unit detects the image file transmission disabled state, the prohibiting unit clears prohibition of deletion by the deletion unit of the image file recorded in the storage medium.

According to the ninth aspect of the invention, in the image transmission apparatus according to the second aspect, it is preferred that the prohibiting unit prohibits the deletion unit from deleting an image file for which the external camera has issued a delete prohibit instruction.

According to the tenth aspect of the invention, in the image transmission apparatus according to the ninth aspect, the image transmission apparatus further comprises: a detection unit that detects an image file transmission disabled state with regard to image file transmission to the image reception apparatus. The image files recorded in the storage medium include an image file for which the external camera has issued a delete prohibit instruction, an image file for which the image reception apparatus has issued a delete prohibit instruction and an image file deletion of which is not prohibited by the prohibiting unit. As the detection unit detects the image file transmission disabled state, the prohibiting unit clears prohibition of deletion by the deletion unit of the image file for which the delete prohibit instruction has been issued by the image reception apparatus, without clearing prohibition of deletion by the deletion unit of the image file for which the delete prohibit instruction has been issued by the external camera.

According to the eleventh aspect of the invention, an image reception apparatus comprises: a requesting unit that registers an image file specified by a user into a queue used to manage an order in which the image file is to be transmitted and issues image file transmission requests to an external image transmission apparatus so that image files are transmitted in an order in which the image files are registered in the queue; a command transmission unit that transmits to the image transmission apparatus a delete prohibit command for prohibiting deletion of the image file having been registered into the queue by the requesting unit; and a reception control unit that receives an image file from the image transmission apparatus.

According to the twelfth aspect of the invention, in the image reception apparatus according to the eleventh aspect, it is preferred that once reception of an image file is completed at the reception unit, the requesting unit deletes the image file from the queue. The command transmission unit transmits a command for clearing prohibition of deletion of the image file to the image transmission apparatus.

According to the thirteenth aspect of the invention, in the image reception apparatus according to the eleventh aspect, it is preferred that if the user cancels a transmission request for an image file, the requesting unit deletes the image file from the queue. The command transmission unit transmits a command for clearing prohibition of deletion of the image file to the image transmission apparatus.

According to the fourteenth aspect of the invention, in the image reception apparatus according to the eleventh aspect, it is preferred that the image reception apparatus further comprises: a detection unit that detects a command transmission enabled state and a command transmission disabled state with regard to command transmission to the image transmission apparatus. If the detection unit, having detected the command transmission disabled state, then detects the command transmission enabled state, the command transmission unit transmits a clear command for clearing prohibition of image file deletion to the image transmission apparatus.

According to the fifteenth aspect of the invention, in the image reception apparatus according to the eleventh aspect, the image reception apparatus further comprises: a detection unit that detects a command transmission enabled state and a command transmission disabled state with regard to command transmission to the image transmission apparatus. If the detection unit, having detected the command transmission disabled state, then detects the command transmission enabled state, the command transmission unit transmits a command for reassigning prohibition of image file deletion to the image transmission apparatus.

DESCRIPTION OF PREFERRED EMBODIMENT

Figure 1:
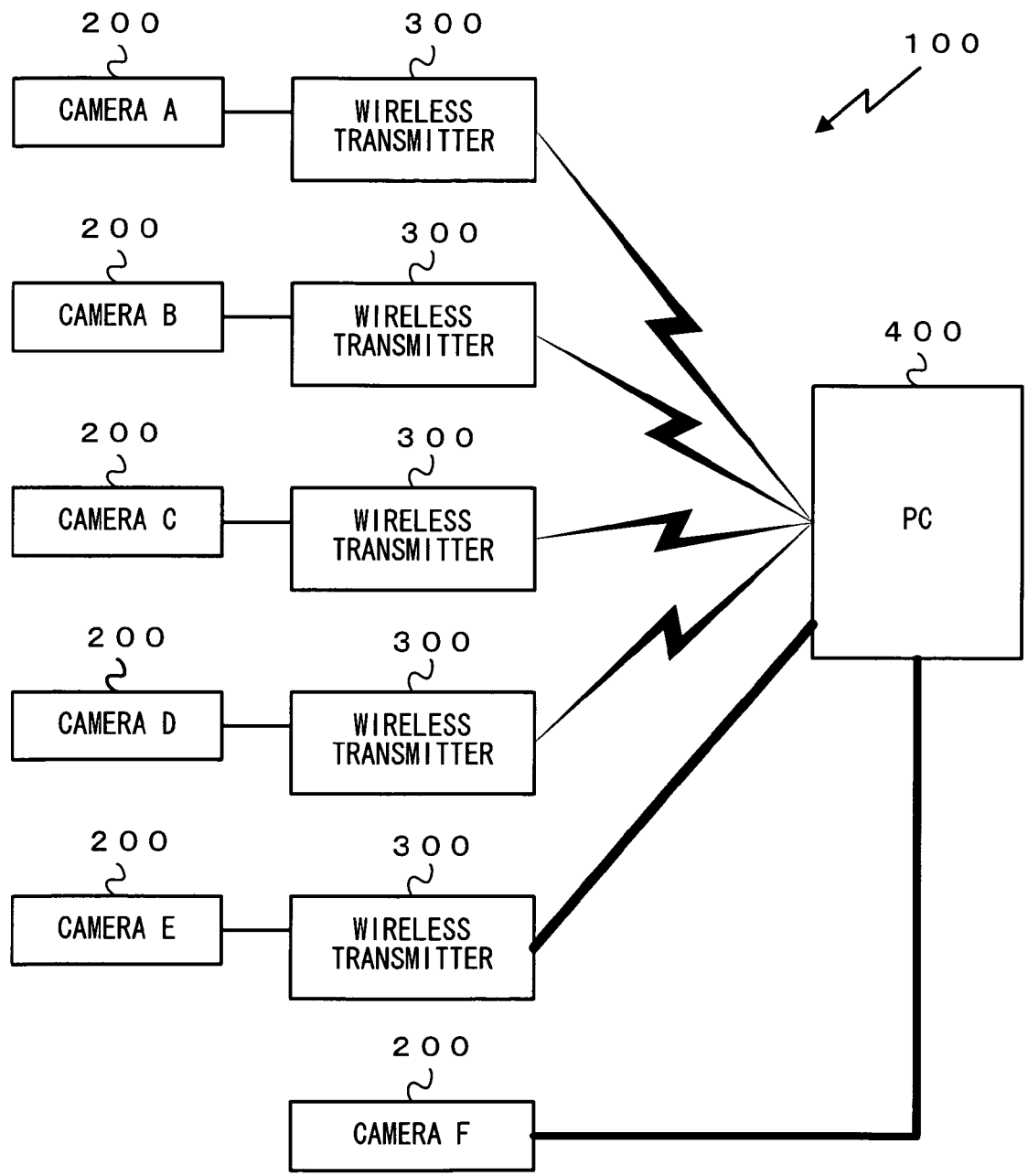
FIG. 1 is a block diagram showing the structure adopted in the image transfer system achieved in an embodiment.

FIG. 1 is a block diagram showing the architecture that may be adopted in the image transfer system achieved in a first embodiment. The image transfer system 100 includes cameras 200, wireless transmitters 300 and a personal computer (PC) 400. It is to be noted that in the image transfer system 100, the cameras each function as an image transmission apparatus that transmits an image file obtained by photographing an image to the PC 400 via the corresponding wireless transmitter 300. The wireless transmitter 300, engaged in operation as a relay device via which the image file originating from the camera 200 is transmitted to the PC 400, also functions as an image transmission apparatus. In addition, the PC 400 functions as an image reception apparatus where the image file, having been received via the wireless transmitter 300, is recorded.

The camera 200 and the wireless transmitter 300 are connected with each other via the respective interface units through which their connection is established. Each time a photographing operation is executed in the camera 200, the resulting image file is transferred to the wireless transmitter 300 where it is recorded into a storage medium installed in the wireless transmitter 300.

The wireless transmitter 300 and the PC 400 are connected with each other either wirelessly or through a wired connection. For instance, the wireless transmitter 300 may include a wireless module that allows it to connect with a wireless LAN and a LAN interface to which a LAN cable is connected. Such a wireless transmitter 300 and the PC 400 may be connected with each other through a wireless LAN or a wired LAN. The user starts up a dedicated image transfer application program on the PC 400 to see a view of thumbnail images corresponding to images recorded in the storage medium in the wireless transmitter 300, select a specific thumbnail image in the view of thumbnail images, and obtain the image file corresponding to the thumbnail image and the like.

As shown in FIG. 1, the PC 400 is capable of simultaneously communicating with a plurality of wireless transmitters 300. A limit may be set to the number of wireless transmitters 300 with which the PC is allowed to communicate at once and the PC 400 in the embodiment is allowed to simultaneously communicate with, for instance, five wireless transmitters 300 either wirelessly or through wired communication. In the example presented in FIG. 1, the PC 400 is in wireless communication with the wireless transmitters 300 connected to cameras A~D, while it is also engaged in wired communication with the wireless transmitter 300 connected to a camera E.

In addition, the PC 400 is capable of directly communicating with a given camera 200 instead of communicating via a wireless transmitter 300. Such direct communication with a camera 200 may be enabled via, for instance, a USB cable connecting the PC 400 with the camera 200. In the example presented in FIG. 1, the PC 400 is engaged in direct communication with a camera F.

Figure 2:
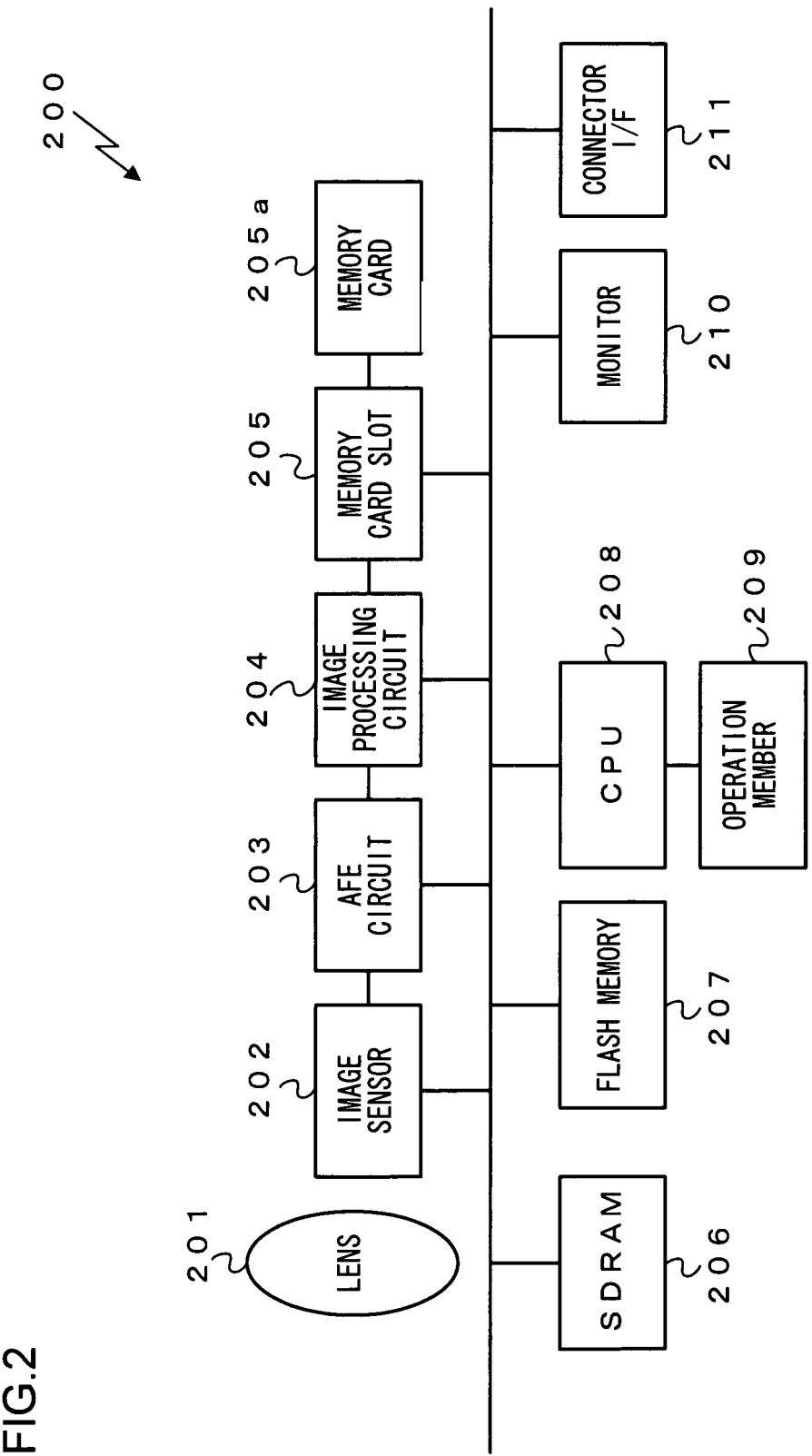
FIG. 2 is a block diagram showing a structure that may be adopted in cameras 200 in the embodiment.

FIG. 2 is a block diagram showing a structure that may be adopted in the cameras 200 in the embodiment. The camera 200 in FIG. 2 includes a lens 201, an image sensor 202, an AFE (Analog Front End) circuit 203, an image processing circuit 204, a memory card slot 205, an SDRAM 206, a flash memory 207, a CPU 208, an operation member 209, a monitor 210 and a connector I/F 211.

A control program recorded in the flash memory 207 is read into the SDRAM 206 and executed in the SDRAM 206 by the CPU 208 so as to control the overall operation of the camera 200. It is to be noted that the SDRAM 206, which is a volatile memory, is utilized as a work area by the program during program execution by the CPU 208 or as a buffer memory where data are temporarily recorded. In the flash memory 207 constituted with a non-volatile memory, data related to the program executed by the CPU 208, various parameters which are read for the program execution and the like are recorded.

The lens 201 is constituted with a plurality of optical lenses and a subject image is formed onto the image sensor 202 via the group of lenses. The image sensor 202 may be a CCD image sensor or a CMOS image sensor that executes photoelectric conversion on the subject image to generate analog image signals and outputs the analog image signals thus generated to the AFE circuit 203.

The AFE circuit 203 executes gain adjustment, such as signal amplification corresponding to a selected ISO speed (ISO sensitivity) setting, on the analog image signals. The analog image signals are then converted to digital image data in an A/D conversion circuit built into the AFE circuit 203 and the digital image data resulting from the conversion are output from the AFE circuit to the image processing circuit 204.

The image processing circuit 204 executes various types of image processing, e.g., color interpolation processing, gradation conversion processing, edge emphasis processing and white balance adjustment processing on the digital image data and the image data having undergone the image processing (hereafter simply referred to as "image data") are output from the image processing circuit to the SDRAM 206 functioning as a buffer memory.

The CPU 208 reduces the image data recorded in the SDRAM 206 and generates thumbnail image data. The CPU 208 then generates an image file containing the image data and the thumbnail image data. The CPU 208 records the image file into the flash memory 207 used as the internal memory or into a memory card 205a loaded into the memory card slot 205 and used as an external memory. It is to be noted that the memory card slot 205 includes a slot portion where the memory card 205a used as the external memory is inserted and an image file is written into the memory card 205a or an image file is read out from the memory card 205a via the memory card slot 205 in response to an instruction issued from the CPU 208.

The operation member 209 includes various types of operation members operated by the user, such as a power button, a shutter release button, a zoom button, a cross key, and a confirm button. The monitor 210 is a liquid crystal monitor (back-side monitor) mounted at the rear of the camera 200. The CPU 208 outputs information such as an image file stored in the memory card 205a or a setting menu to the monitor 210 so as to display at the monitor 210 the image or the setting menu in which settings for the camera 200 can be selected. The connector I/F 211 is an interface unit via which the camera 200 is connected with the wireless transmitter 300 as described earlier.

Figure 3:
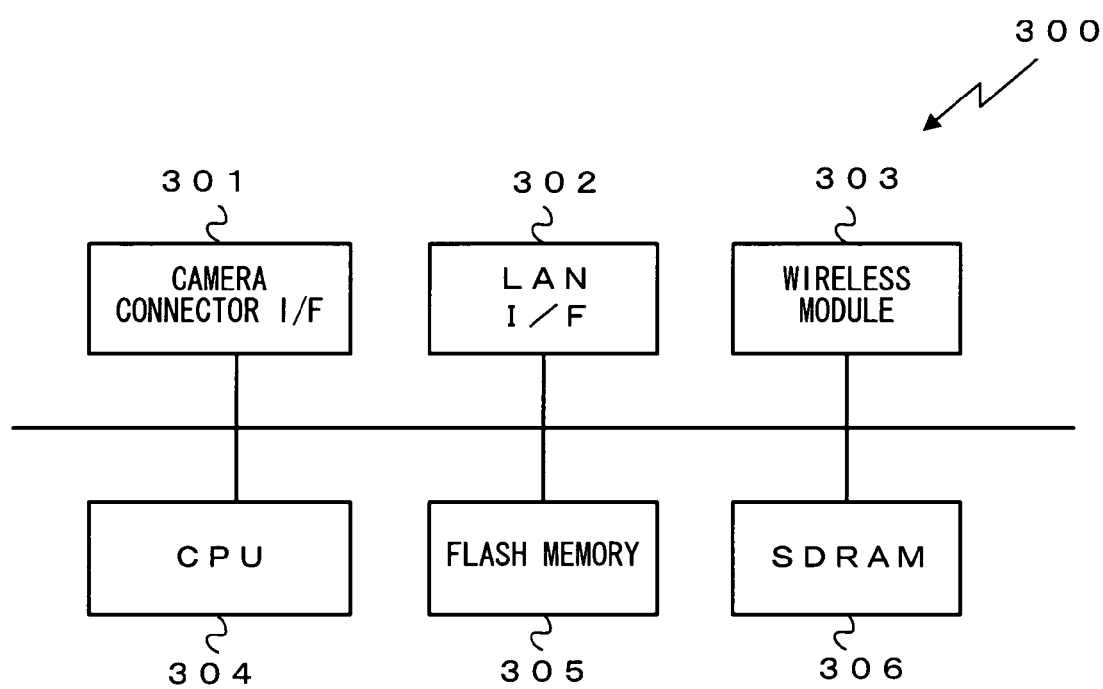
FIG. 3 is a block diagram showing a structure that may be adopted in wireless transmitters 300 in the embodiment.

FIG. 3 is a block diagram showing a structure that may be adopted in the wireless transmitters 300 in the embodiment. The wireless transmitter 300 in the figure includes a camera connector I/F 301, a LAN I/F 302, a wireless module 303, a CPU 304, a flash memory 305 and an SDRAM 306.

The camera connector I/F 301 is an interface unit via which the wireless transmitter 300 is connected with the camera 200, as described earlier. The LAN I/F 302 is an interface unit to which a LAN cable is connected to establish a wired connection for the wireless transmitter 300 and the PC 400. The wireless module 303 controls wireless communication between the wireless transmitter 300 and the PC 400 when establishing wireless connection with the PC 400.

In the flash memory 305 constituted with a nonvolatile memory, an image file transferred from the camera 200, various parameters read for the program execution and the like are recorded. As explained earlier, the image file transferred from the camera 200 contains image data (main image data) expressing the main image obtained through photographing operation and image data (thumbnail image data) expressing the thumbnail image generated by reducing the main image. The SDRAM 306, which is a volatile memory, is utilized as a work area by the program during program execution by the CPU 304 or as a buffer memory where data are temporarily recorded.

The CPU 304 controls the various units constituting the wireless transmitter 300. For instance, as an image file originating from the camera 200 is input via the camera connector I/F 301, the CPU 304 executes controlling so as to record the image file into the flash memory 305 used as a storage medium. In addition, an image file recorded in the flash memory 305 is opened in the SDRAM 306 functioning as a buffer memory and is transferred to the PC 400 via the LAN I/F 302 or the wireless module 303 under control executed by the CPU 304.

Figure 4:
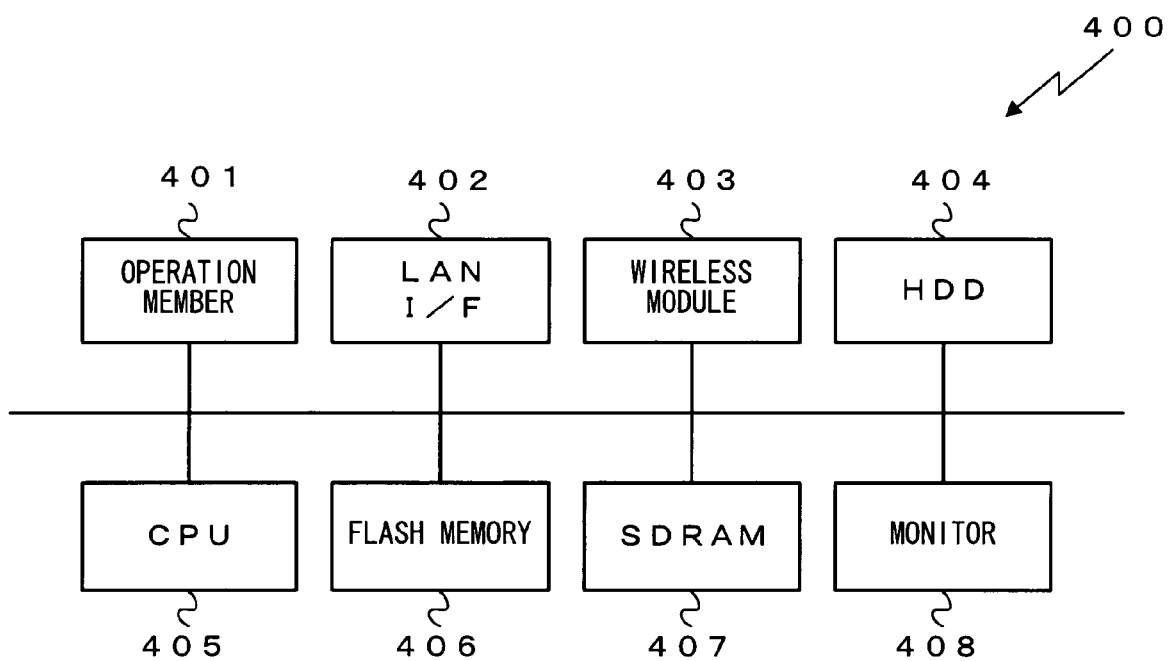
FIG. 4 is a block diagram showing a structure that may be adopted in the PC 400 in the embodiment.

FIG. 4 is a block diagram showing a structure that may be adopted in the PC 400 in the embodiment. The PC 400 includes an operation member 401, a LAN I/F 402, a wireless module 403, an HDD (hard disk drive) 404, a CPU 405, a flash memory 406, an SDRAM 407 and a monitor 408.

The operation member 401 includes various devices operated by the user such as a keyboard and a mouse. The LAN I/F 402 is an interface unit that is connected with a LAN cable to establish a wired connection with a wireless transmitter 300. The wireless module 403 controls wireless communication with the wireless transmitter 300.

The HDD 404 is a storage medium in which image files obtained from the wireless transmitters 300, various programs to be executed by the CPU 405 and the like are recorded. The CPU 405 controls the various units constituting the PC 400.

In the flash memory 406 constituted with a nonvolatile memory, various parameters read for the program execution and the like are recorded. The SDRAM 407, which is a volatile memory, is utilized as a work area by the program during program execution by the CPU 405 or as a buffer memory where data are temporarily recorded. At the monitor 408, which may be, for instance, a liquid crystal monitor, various types of information output from the CPU 405 are displayed.

Since the flash memory 305 installed in the wireless transmitter 300 in the image transfer system 100 described above has a limited storage capacity (e.g., a total storage capacity of 1 GB), no more image files can be recorded into the flash memory 305 once the available memory space in the flash memory 305 having accumulated image files is depleted. Accordingly, the CPU 304 in the embodiment compares the data size of an image file received from the camera 200 with the available capacity at the flash memory 305 and if the data size of the image file is greater than the available capacity, the CPU 304 automatically deletes an image file recorded in the flash memory 305.

As explained earlier, the PC 400 in the embodiment is capable of obtaining an image file from a wireless transmitter 300 in response to an instruction issued by the user. More specifically, the CPU 405 creates in advance a transfer queue in the SDRAM 407, to be used to manage the order in which image files are transmitted and if the user issues an image file acquisition request in the image transfer application program, the file name of the transfer target image file having been requested is added into the transfer queue. The CPU 405 sends out image file transfer requests to the wireless transmitter 300 in an order matching the order with which the file names of the individual image files are listed in the transfer queue. The CPU 304 in the wireless transmitter 300, in turn, transmits the requested image file to the PC 400 in response to a transfer request from the PC 400.

As described earlier, if necessary, the CPU 304 in the wireless transmitter 300 automatically deletes an image file from the flash memory 305 upon receiving a new image file from the camera 200. In other words, if, for instance, the CPU 304 deletes image files in chronological order starting with the oldest photographing dates in the flash memory 305, an image file assigned with a file name in the transfer queue at the PC 400 may be deleted from the flash memory 305. In such a case, the CPU 304 shall not be able to transmit the image file in response to a transfer request from the PC 400.

In order to avoid such a problematic situation, the CPU 405 in the PC 400 in the embodiment transmits to the wireless transmitter 300 a delete prohibit command prohibiting deletion of an image file when the file name of the image file is added into the transfer queue in response to the acquisition request for the particular image file issued by the user. Upon receiving the delete prohibit command from the PC 400, the CPU 304 in the wireless transmitter 300 assigns a delete prohibit attribute to the image file the deletion of which has been prohibited. It is to be noted that the delete prohibit attribute is set in file information managed by a file management system, e.g., in FAT information.

If the data size of an image file newly received from the camera 200 is greater than the available capacity of the flash memory 305, the CPU 304 deletes image files that are not assigned with the delete prohibit attribute among the image files recorded in the flash memory 305 in chronological order starting with the oldest photographing date first. Through these measures, a problematic situation in which, when an image file transfer is requested by the PC 400, the requested image file is already deleted from the flash memory 305 and therefore cannot be transferred in response to the request, is averted.

Figure 5:
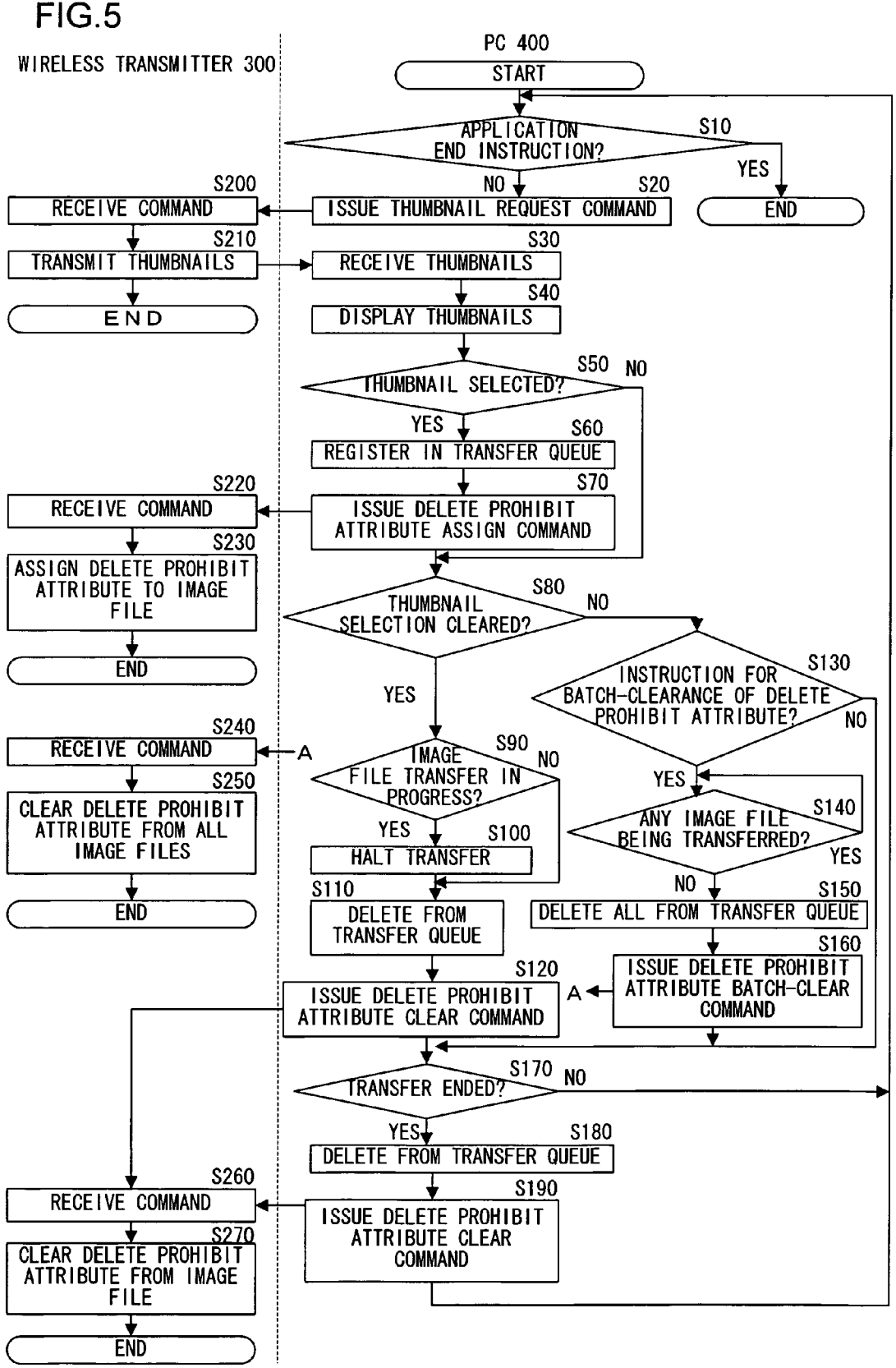
FIG. 5 presents a flowchart of the processing executed in a wireless transmitter 300 and the PC 400 in response to an image file transfer request issued by the user via the PC 400.

The following is an explanation, given in reference to FIG. 5, of the processing executed in the wireless transmitter 300 and the PC 400 in response to an image file transfer request issued by the user via the PC 400. The processing in FIG. 5 starts as the image transfer application program is launched on the PC 400.

In step S10, the CPU 405 in the PC 400 makes a decision as to whether or not an instruction for exiting the image transfer application has been issued by the user via the operation member 401. If an affirmative decision is made, the processing ends. However, if a negative decision is made, the operation proceeds to step S20 in which the CPU 405 issues a thumbnail request command to the wireless transmitter 300, requesting a thumbnail image transmission.

Upon receiving the thumbnail request command from the PC 400 in step S200, the CPU 304 in the wireless transmitter 300 proceeds to execute the processing in step S210. In step S210, the CPU 304 obtains the thumbnail image data in each of the image files recorded in the flash memory 305 and transmits the thumbnail image data thus obtained to the PC 400, before ending the processing.

After the thumbnail image data from the wireless transmitter 300 are received in step S30, the CPU 405 displays a view of thumbnail images at the monitor 408 in step S40. It is to be noted that in the embodiment, the user is allowed to issue an instruction to the wireless transmitter 300 for attaching an attention mark such as a mark taking on the shape of a musical note (musical note mark) to an image file containing an attention-target image and in response to the instruction, the CPU 304 in the wireless transmitter 300 attaches the musical note mark to the image file in relation to which the instruction has been issued. The CPU 304 transmits the thumbnail image of the image file appended with the musical note mark by attaching the musical note mark to the thumbnail image in step S210. It is to be noted that the processing executed to attach the musical note mark to the image file is to be described later in reference to FIG. 7.

The CPU 405 displays the musical note mark in correspondence to any thumbnail image appended with the musical note mark among the thumbnail images in the view of thumbnail images. Thus, the thumbnail image of the image file the user of the camera 200 wishes to draw attention to is marked for attention at the PC 400.

The operation subsequently proceeds to step S50, in which a decision is made as to whether or not the thumbnail image corresponding to a transfer target image file has been selected by the user via the operation member 401. For instance, the user may select a specific thumbnail image by entering a check in a check box displayed in correspondence to the thumbnail image. If a negative decision is made in step S50, the operation proceeds to step S80 to be detailed later. If, on the other hand, an affirmative decision is made in step S50, the operation proceeds to step S60.

In step S60, the CPU 405 adds (registers) the file name of the image file corresponding to the thumbnail image selected by the user to the transfer queue, as described earlier, and then the operation proceeds to step S70. It is to be noted that as an image file name is added to the transfer queue in step S60, the CPU 405 starts image transfer processing in a separate thread to obtain image files from the wireless transmitter 300 in the order in which their file names are registered in the transfer queue.

In step S70, the CPU 405 issues a delete prohibit attribute assign command to the wireless transmitter 300 as a form of an instruction for assigning the delete prohibit attribute to the image file assigned with the file name registered in the transfer queue. Subsequently, the operation proceeds to step S80 to be described later.

Upon receiving the delete prohibit attribute assign command from the PC 400 in step S220, the CPU 304 assigns the delete prohibit attribute to the image file indicated by the PC 400 based upon the command, in step S230 before ending the processing.

In step S80, a decision is made as to whether or not the selection of the thumbnail image determined for selection in step S50 has been cleared by the user via the operation member 401. The user may clear the selection of the thumbnail image by clearing the check mark at the check box corresponding to the thumbnail image, so as to cancel the transmission request for the image file. If an affirmative decision is made in step S80, the operation proceeds to step S90. In step S90, the CPU 405 makes a decision as to whether or not the image file corresponding to the thumbnail image, the selection of which has been cleared by the user, is currently being transferred by verifying the transfer status of the image transfer processing in progress in a separate thread.

If an affirmative decision is made, the operation proceeds to step S100, in which the CPU 405 issues an instruction to the thread executing the image transfer processing for halting the transfer of the image file currently underway and once the image file transfer is halted, the operation proceeds to step S110. However, if a negative decision is made in step S90, the operation proceeds directly to step S110. In step S110, the CPU 405 deletes the file name of the image file corresponding to the thumbnail image, the selection of which has been determined to be cleared in step S80, from the transfer queue, and then the operation proceeds to step S120.

In step S120, the CPU 405 issues a delete prohibit attribute clear command to the wireless transmitter 300 as a form of an instruction for clearing the delete prohibit attribute assigned to the image file corresponding to the thumbnail image, the selection of which has been determined to be cleared in step S80. Subsequently, the operation proceeds to step S170 to be described later.

Upon receiving the delete prohibit attribute clear command from the PC 400 in step S260, the CPU 304 clears the delete prohibit attribute assigned to the image file indicated by the PC 400 based upon the received command in step S270 before ending the processing.

If, on the other hand, a negative decision is made in step S80, the operation proceeds to step S130. In step S130, the CPU 405 makes a decision as to whether or not the user has issued an instruction via the operation member 401 for clearing the delete prohibit attribute in a batch from all the image files assigned with the delete prohibit attribute at the wireless transmitter 300. For instance, the user may select a "clear all" button in the image transfer application program by operating the operation member 401 to issue an instruction for a batch-clearance of the delete prohibit attribute.

If a negative decision is made in step S130, the operation proceeds to step S170 to be described later. However, if an affirmative decision is made in step S130, the operation proceeds to step S140. In step S140, the CPU 405 makes a decision as to whether or not an image file transfer is currently underway by checking the transfer status of the image transfer processing being executed in a separate thread. If an affirmative decision is made, the operation waits in standby for the current image file transfer to be completed. If, on the other hand, a negative decision is made, the operation proceeds to step S150.

In step S150, the CPU 405 deletes all the file names from the transfer queue and then the operation proceeds to step S160. In step S160, the CPU 405 issues a delete prohibit attribute batch-clear command to the wireless transmitter 300 as a form of an instruction for batch-clearing the delete prohibit attribute from all the image files assigned with the delete prohibit attribute and then the operation proceeds to step S170 to be described later.

Upon receiving the delete prohibit attribute batch-clear command from the PC 400 in step S240, the CPU 304 clears the delete prohibit attribute in a batch from all the image files assigned with the delete prohibit attribute based upon the received command in step S250 before ending the processing.

In step S170, the CPU 405 makes a decision as to whether or not a notice has been received from image transfer processing in progress in a separate thread indicating that the transfer of the first image file registered in the transfer queue has been completed. If a negative decision is made, the CPU 405 returns to step S10 to repeatedly execute the processing. If, on the other hand, an affirmative decision is made in step S170, the operation proceeds to step S180. In step S180, the CPU 405 deletes the file name of the image file, the transfer of which has been completed, from the transfer queue and then the operation proceeds to step S190.

In step S190, the CPU 405 issues a delete prohibit attribute clear command as a form of an instruction for clearing the delete prohibit attribute assigned to the image file, the transfer of which has been completed. The operation then returns to step S10. In addition, the CPU 304, having received the delete prohibit attribute clear command from the PC 400 in step S260 as described above, clears the delete prohibit attribute assigned to the image file indicated by the PC 400 in step S270 before ending the processing.

Figure 6:
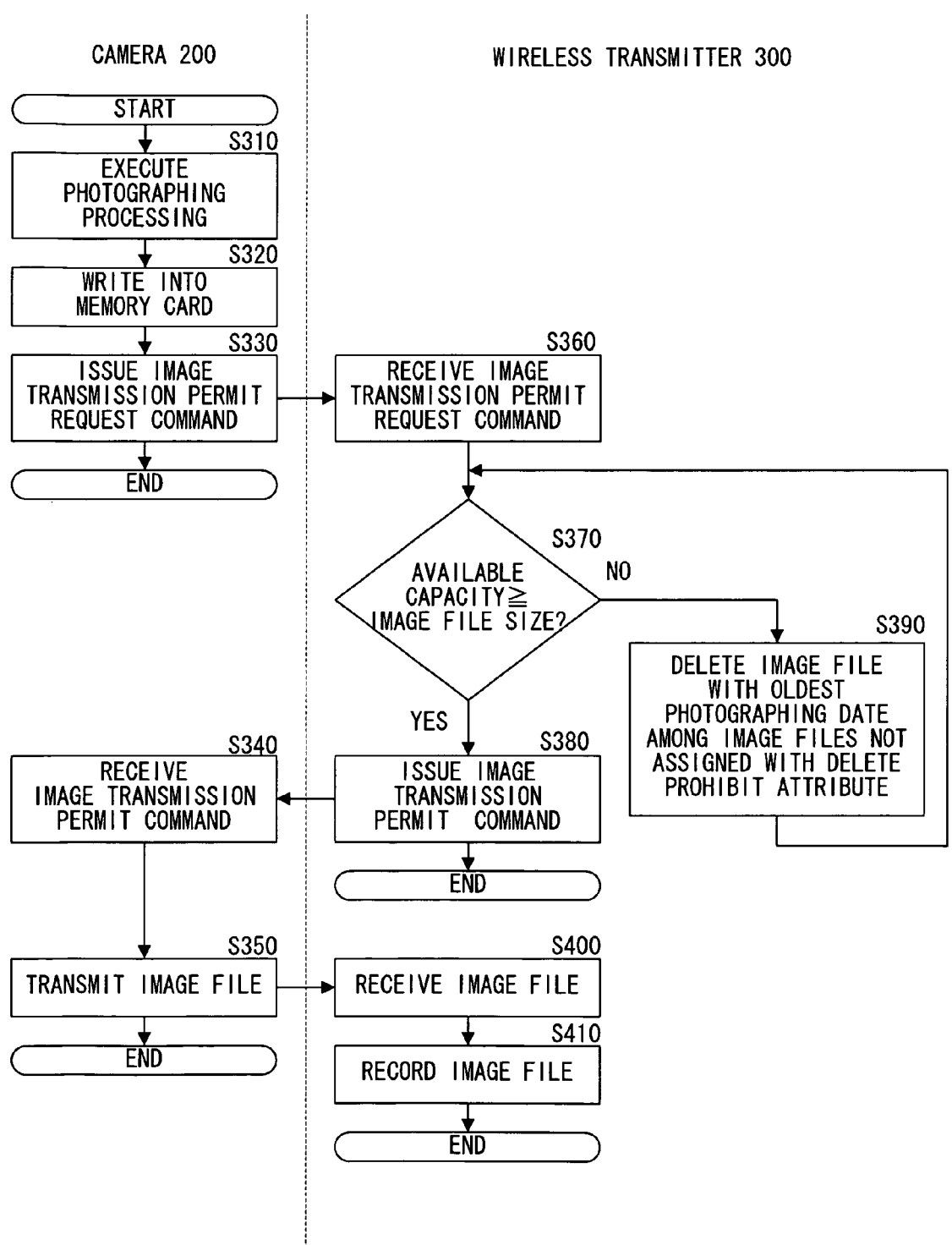
FIG. 6 presents a flowchart of the processing executed in a camera 200 and the wireless transmitter 300 as an image is photographed with the camera 200.

Next, the processing executed in the camera 200 and the wireless transmitter 300 as an image is photographed with the camera 200 is described in reference to FIG. 6. The processing in FIG. 6 starts in response to a photographing instruction issued by the user by depressing the shutter release button included in the operation member 209 at the camera 200.

In step S310, the CPU 208 in the camera 200 executes photographing processing and generates an image file containing image data and thumbnail image data as explained earlier. Subsequently, the operation proceeds to step S320 in which the CPU 208 records the generated image file into the memory card 205a loaded into the memory card slot 205, before the operation proceeds to step S330. In step S330, the CPU 208 issues an image transmission permit verify command to the wireless transmitter 300, requesting permission to transmit the image file having been generated in step S310 and then ends the processing. The image transmission permit verify command is appended with data size information indicating the data size of the image file, the permission for transmission of which has been requested.

The CPU 304 in the wireless transmitter receives the image transmission permit verify command from the camera 200 in step S360. Then, in step S370, the CPU 304 compares the data size of the image file indicated in the information appended to the image transmission permit verify command having been received with the available capacity at the flash memory 305 to make a decision as to whether or not the available capacity at the flash memory 305 is equal to or greater than the data size of the image file. In other words, it makes a decision as to whether or not the image file to be transmitted from the camera 200 can be recorded into the flash memory 305.

If an affirmative decision is made, the operation proceeds to step S380 to be described later. However, if a negative decision is made, the operation proceeds to step S390. In step S390, the CPU 304 ascertains whether or not the delete prohibit attribute is assigned to each of the image files by referencing the FAT information and deletes the image file with the oldest photographing date among the image files that are not assigned with the delete prohibit attribute in the flash memory 305, before the operation returns to step S370. The processing in step S390 is repeatedly executed until an affirmative decision is made in step S370. Through these measures, image files are deleted in chronological order starting with the oldest photographing dates, until sufficient memory space for recording the new image file becomes available in the flash memory 305.

In step S380, the CPU 304 issues an image transmission permit command to the camera 200, so as to permit the transmission of the image file. Upon receiving the image transmission permit command from the wireless transmitter 300 in step S340, the CPU 208 transmits the image file generated in step S310 to the wireless transmitter 300 in step S350, before ending the processing.

In step S400, the CPU 304 receives the image file from the camera 200 and then in step S410, it records the received image file into the flash memory 305, before ending the processing.

It is to be noted that the embodiment also allows the user to issue an instruction to the wireless transmitter 300 for assigning the delete prohibit attribute to an image file, deletion of which the user wishes to prohibit, by operating the operation member 209 at the camera 200 after the image file is transmitted to the wireless transmitter 300. In addition, the user is also allowed to issue an instruction to the wireless transmitter 300 for appending the musical note mark to an image file that the user wishes to draw attention to, by operating the operation member 209 at the camera 200.

Furthermore, the embodiment allows the user to issue an instruction via the camera 200 to the wireless transmitter 300 for clearing (individually clearing) the delete prohibit attribute assigned to a specific image file recorded in the flash memory 305 or for clearing (batch-clearing) the delete prohibit attribute from all the image files in the flash memory 305 currently assigned with the delete prohibit attribute.

Figure 7:
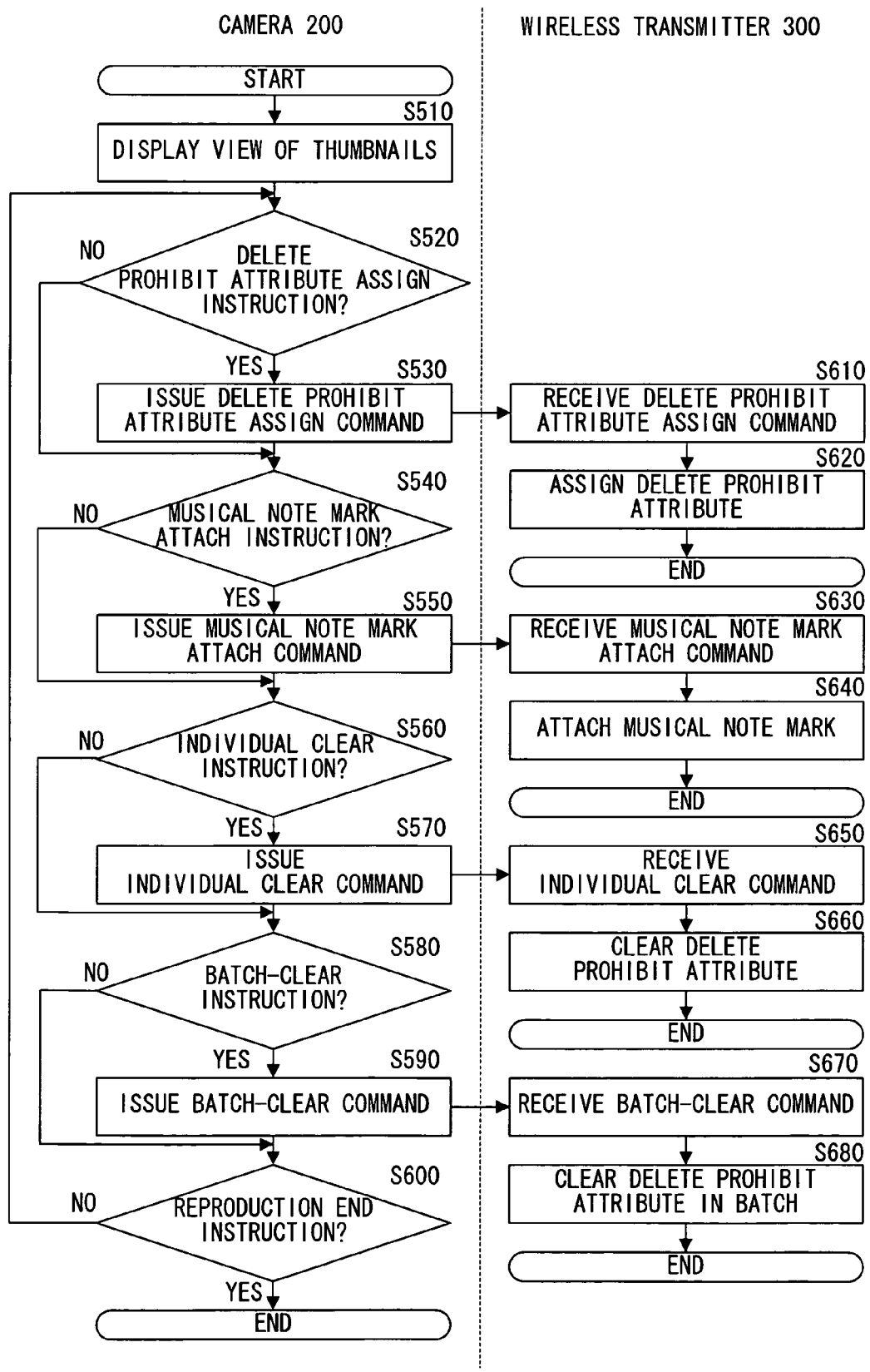
FIG. 7 presents a flowchart of the processing executed in the camera 200 and the wireless transmitter 300 as an instruction for assignment of a delete prohibit attribute is issued at the camera 200, as an instruction for attachment of a musical note mark is issued at the camera 200, as an instruction for individual clearance of the delete prohibit attribute is issued at the camera or as an instruction for batch-clearance of the delete prohibit attribute is issued at the camera.

Next, in reference to FIG. 7, the processing executed as the user issues an instruction via the camera 200 for assigning the delete prohibit attribute to an image file, as the user issues an instruction via the camera 200 for attaching the musical note mark to an image file, or as the user issues an instruction via the camera 200 for individually clearing the delete prohibit attribute or as the user issues an instruction via the camera 200 for batch-clearing the delete prohibit attribute, is described. The processing in FIG. 7 starts as the user issues an instruction for reproducing at the monitor 210 an image file recorded in the memory card 205*a* by operating the operation member 209 at the camera 200.

In step S510, the CPU displays a view of thumbnail images at the monitor 210 by reading out the thumbnail images in the image files recorded in the memory card 205*a* in response to the image reproduction instruction issued by the user. The embodiment allows the user to select one of the thumbnail images in the view of thumbnail images and assign the delete prohibit attribute or attach the musical note mark to the image file corresponding to the selected thumbnail image by operating the operation member 209.

The user is also allowed to individually clear the delete prohibit attribute assigned to a specific image file by issuing an instruction for clearing the delete prohibit attribute assigned to the image file corresponding to a thumbnail image selected in the view of thumbnail images via the operation member 209. In addition, the user is able to batch-clear the delete prohibit attribute by selecting all the thumbnail images in the view of thumbnail images and issuing an instruction for clearing the delete prohibit attribute. It is to be noted that a "clear all" button may be displayed on the screen so as to allow the user to issue a batch-clear instruction by depressing the "clear all" button on display.

The operation subsequently proceeds to step S520 in which the CPU 208 makes a decision as to whether or not any thumbnail image has been selected and an instruction for assigning the delete prohibit attribute to the corresponding image file has been issued by the user via the operation member 209. If a negative decision is made, the operation proceeds to step S540 to be described later. If, on the other hand, an affirmative decision is made, the operation proceeds to step S530. In step S530, the CPU 208 issues to the wireless transmitter 300 a delete prohibit attribute assign command that includes information to be used to identify the file name of the image file in relation to which the instruction for assigning the delete prohibit attribute has been issued by the user and then the operation proceeds to step S540 to be described later.

In step S610, the CPU 304 in the wireless transmitter 300 receives the delete prohibit attribute assign command from the camera 200. Then, in step S620, the CPU 304 assigns the delete prohibit attribute to the image file with the filename identified based upon the delete prohibit command among the image files recorded in the flash memory 305, and then the processing ends.

In step S540, the CPU 208 in the camera 200 makes a decision as to whether or not the user has selected a thumbnail image and has issued an instruction for attaching the musical note mark to the corresponding image file via the operation member 209. If a negative decision is made, the operation proceeds to step S560 to be described later. However, the operation proceeds to step S550 upon making an affirmative decision. In step S560, the CPU 208 issues to the wireless transmitter 300 a musical note mark attach command that includes information to be used to identify the file name of the image file in relation to which the instruction for attaching the musical note mark has been issued by the user and then the operation proceeds to step S560 to be described later.

In step S630, the CPU 304 in the wireless transmitter 300 receives the musical note mark attach command from the camera 200. Subsequently, in step S640, the CPU 304 attaches the musical note mark to the image file assigned with the filename identified based upon the musical note mark attach command among the image files recorded in the flash memory 305 before ending the processing.

In step S560, the CPU 208 in the camera 200 makes a decision as to whether or not the user has selected a thumbnail image and has issued an instruction for individually clearing the delete prohibit attribute assigned to the corresponding image file via the operation member 209. If a negative decision is made, the operation proceeds to step S580 to be described later. However, the operation proceeds to step S570 upon making an affirmative decision. In step S570, the CPU 208 issues an individual clear command to the wireless transmitter 300 that includes information to be used to identify the file name of the image file for which an instruction for individual clearance of the assigned delete prohibit attribute has been issued by the user and then the operation proceeds to step S580.

In step S650, the CPU 304 in the wireless transmitter 300 receives the individual clear command from the camera 200. Subsequently, in step S660, the CPU 304 clears the delete prohibit attribute assigned to the image file with the file name identified based upon the individual clear command among the image files recorded in the flash memory 305 before ending the processing.

In step S580, the CPU 208 in the camera makes a decision as to whether or not all the thumbnail images have been selected and an instruction for batch-clearing the delete prohibit attribute has been issued by the user via the operation member 208 or whether or not the user has depressed the "clear all" button to issue an instruction for batch-clearing the delete prohibit attribute. If a negative decision is made, the operation proceeds to step S600 to be described later. However, the operation proceeds to step S590 upon making an affirmative decision. In step S590, the CPU 208 issues to the wireless transmitter 300 a batch-clear command as a form of an instruction for batch-clearing the delete prohibit attribute and then the operation proceeds to step S600 to be described later.

In step S670, the CPU 304 in the wireless transmitter 300 receives the batch-clear command from the camera 200. Subsequently, in step S680, the CPU 304 clears the delete prohibit attribute from all the image files assigned with the delete prohibit attribute among the image files recorded in the flash memory 305 and then ends the processing.

In step S600, the CPU 208 in the camera 200 makes a decision as to whether or not an instruction for ending the image reproduction has been issued by the user via the operation member 209. If a negative decision is made, the operation returns to step S520 to repeatedly execute the processing. If, on the other hand, an affirmative decision is made, the processing ends.

The following advantages are achieved through the embodiment described above.

(1) The CPU 405 in the PC 400 adds the file name of the acquisition target image file requested by the user and issues to the wireless transmitter 300 a delete prohibit attribute assign command in order to prevent the image file from being deleted from the flash memory 305 in the wireless transmitter 300. Upon receiving the delete prohibit attribute assign command, the CPU 304 in the wireless transmitter 300 identifies the image file, the transmission of which has been requested by the PC 400, and assigns the delete prohibit attribute to the identified image file so as to prohibit deletion of the image file from the flash memory 305. Namely, the CPU 304 prohibits deletion of the image file, the transmission of which is booked by the PC 400 by assigning the delete prohibit attribute to the image file. The CPU 304 then reads out the identified image file from the flash memory 305 and transmits it to the PC 400. Thus, an undesirable situation in which an image file booked for transmission by the PC 400 becomes deleted from the flash memory 305 and thus cannot be transmitted to the PC 400 does not occur.

(2) If the available capacity at the flash memory 305 is smaller than the data size of the image file newly received from the camera 200, the CPU 304 deletes as many image files not assigned with the delete prohibit attribute as necessary in order to secure at the flash memory 305 memory space equal to or greater than the data size of the image file among the image files recorded in the flash memory 305. Thus, the image file received from the camera 200 can be recorded into the flash memory 305 without deleting any image file, the deletion of which is prohibited.

(3) Once the transfer of an image file from the wireless transmitter 300 is completed, the CPU 405 in the PC 400 transmits a delete prohibit attribute clear command for the particular image file to the wireless transmitter 300. Based upon the delete prohibit attribute clear command from the PC 400, the CPU 304 in the wireless transmitter 300 clears the delete prohibit attribute from the corresponding image file. Namely, once the transmission of the image file to the PC 400 is completed, the CPU 304 clears the prohibition of the deletion of the image file by clearing the delete prohibit attribute from the image file. The deletion of the image file having been transmitted to the PC 400 is thus permitted.

(4) The CPU 405 in the PC 400 registers the acquisition target image file requested by the user in the queue through which the image file transmission sequence is managed and requests for image file transmission are issued to the wireless transmitter 300 in the order matching the order with which the image files are registered in the transfer queue. In addition, the CPU 405 transmits a delete prohibit attribute assign command for prohibiting deletion of an image file registered in the transfer queue to the wireless transmitter 300. The CPU 405 subsequently receives the image file from the wireless transmitter 300. Through these measures, the image file booked for transfer by the user via the PC 400 is prevented from becoming deleted from the wireless transmitter 300 before reception of the image file is completed.

(5) Once the reception of the image file from the wireless transmitter 300 is completed, the CPU 405 deletes the image file from the transfer queue and transmits a delete prohibit attribute clear command for clearing prohibition of the deletion of the particular image file to the wireless transmitter 300. The deletion of the image file is thus permitted once the reception is completed.

(6) If the user cancels an image file transmission request, the CPU 405 deletes the file name of the image file from the transfer queue and transmits a delete prohibit attribute clear command to the wireless transmitter 300. The deletion of the image file, the transfer request for which has been canceled, is thus permitted.

—Variations—

It is to be noted that the image transfer system achieved in the embodiment described above allows for the following variations.

(1) An explanation is given above in reference to the embodiment on an example in which the delete prohibit attribute is assigned to an image file recorded in the flash memory 305 in the wireless transmitter 300 when the file name of the image file is registered in the transfer queue at the PC 400 or when an instruction for assigning the delete prohibit attribute is issued by the user via the camera 200. As an alternative, the user may issue an instruction for assigning the delete prohibit attribute via the wireless transmitter 300 by performing a specific operation at the wireless transmitter 300.

For instance, an operation member and a monitor may be disposed at the wireless transmitter 300 and the CPU 304 may display at the monitor a view of thumbnail images of the image files recorded in the flash memory 305 in response to a user operation at the operation member. In the screen, check boxes where the user enters check marks to select individual thumbnail images should also be displayed each in correspondence to one of the thumbnail images. The user is able to issue an instruction for assigning the delete prohibit attribute to the image file corresponding to a specific thumbnail image selected via the operation member by entering a check mark in the check box on the monitor corresponding to the thumbnail image of the delete prohibit attribute assignment target. The CPU 304 shall then assign the delete prohibit attribute to the image file corresponding to the thumbnail image having been selected by the user among the image files recorded in the flash memory 305. It is to be noted that the user may also be allowed to issue an instruction for clearing the delete prohibit attribute assigned to the image file corresponding to the thumbnail image by un-checking the check box. Through these measures, the user shall be able to issue instructions for the prohibition of the deletion of the an image file and clearing the prohibition of the deletion of an image file by performing specific operations at the wireless transmitter 300.

(2) In the embodiment described above, the CPU 405 in the PC 400 issues a delete prohibit attribute assign command to the wireless transmitter 300 as the user selects a specific thumbnail image and the filename of the image file corresponding to the thumbnail image is registered in the transfer queue. Instead, the CPU 405 in the PC 400 may issue a delete prohibit attribute assign command to the wireless transmitter 300 for a specific image file, deletion of which the user wishes to prohibit, whenever it receives an image file delete prohibit instruction from the user, independently of the timing of image file transfer requests. In addition, upon receiving an image file delete prohibit clear instruction from the user, the CPU may issue to the wireless transmitter 300 a delete prohibit attribute clear command for the delete prohibit clear target image file.

For instance, the CPU 405 may display check boxes used to select image files to be assigned with a delete prohibit attribute each in correspondence to one of the thumbnail images, in addition to the check boxes used to select image files to be registered in the transfer queue as described earlier. In this case, as the user selects a specific thumbnail image by entering a check in the delete prohibit attribute assignment check box corresponding to the thumbnail image, the CPU shall identify the image file corresponding to the thumbnail image and issue to the wireless transmitter 300 a delete prohibit attribute assign command for the identified image file.

In addition, as the check in a delete prohibit assignment check box is cleared, the CPU 405 shall identify the image file corresponding to the particular thumbnail image and issue to the wireless transmitter 300 a delete prohibit attribute clear command for the identified image file. Through these measures, the user shall be able to issue, via the PC 400, instructions for the prohibition of the deletion of an image file and clearing the prohibition of the deletion of an image file, independently of the timing of image transfer.

(3) In the embodiment described above, the user operates the operation member 209 at the camera 200 to issue an instruction for attaching an attention mark such as a musical note mark to an image file to which he wishes to draw attention among the image files recorded in the flash memory 305 at the wireless transmitter 300. Instead, the user may issue an instruction for attaching the musical note mark via the PC 400. In such a case, the user shall be able to attach the mark to an image file to which he wishes to draw attention via the PC 400 as well.

(4) In the embodiment described above, if the data size of the image file newly received from the camera 200 is greater than the available capacity at the flash memory 305, the CPU 304 deletes image files not assigned with the delete prohibit attribute among the image files recorded in the flash memory 305, in chronological order starting with the oldest photographic dates, as required until sufficient memory space has been secured in the flash memory 305 for recording the received image file. Then, when sufficient memory space for recording the received image file has been secured in the flash memory 305, the CPU 304 records the image file into the flash memory 305.

However, if the delete prohibit attribute is assigned to a large number of image files recorded in the flash memory 305, sufficient memory space may not be available in the flash memory 305 even by deleting all the image files that are not assigned with the delete prohibit attribute. In such a case, the CPU 304 may hold the image file in the SDRAM 306 until sufficient memory space becomes available in the flash memory 305, at which point the image file can be recorded into the flash memory 305.

As an alternative, the CPU 304 may discard the image file without recording it in the flash memory 305 and as sufficient memory space becomes available in the flash memory 305, the CPU 304 may issue a request for a resend to the camera 200. In such a case, upon receiving the resend request from the wireless transmitter 300, the CPU 208 in the camera 200 should read out the requested image file from the memory card 205a and transmit it to the wireless transmitter 300.

(5) In the embodiment described above, the camera 200 and the wireless transmitter 300 are individually utilized as image transmission apparatuses. Namely, an image file generated through a photographing operation at the camera 200 is transmitted to the wireless transmitter 300 where the image file is recorded into the flash memory 305 and the wireless transmitter 300, in turn, transmits an image file to the PC 400 in response to an image transmission request from the PC 400. However, the camera 200 and the wireless transmitter 300 may be integrated into a single image transmission apparatus. In other words, a camera 200 equipped with wireless transmitter functions (or a wireless transmitter 300 equipped with camera functions) may be used as an image transmission apparatus.

(6) After the CPU 304 in the wireless transmitter 300 receives a delete prohibit attribute assign command from the PC 400, the delete prohibit attribute is not cleared until the CPU 304 receives a delete prohibit attribute clear command from the PC 400 in the embodiment described above. However, if a communication failure occurs in the communication between the wireless transmitter 300 and the PC 400, the CPU 304 in the wireless transmitter 300 may autonomously clear the delete prohibit attribute from the image files currently assigned with the delete prohibit attribute, instead.

Through these measures, an image file from the camera 200 can be received by securing sufficient memory space for recording the new image file in the flash memory 305 following, for instance, a temporary communication failure. As a result, as soon as the communication is restored, the CPU 304 in the wireless transmitter 300 is able to transfer the image file recorded in the flash memory 305 to the PC 400, assuring a higher level of convenience by allowing prompt resumption of the processing.

In addition, even after a temporary communication failure, the available memory space in the flash memory 305 is not taken up by an image file assigned with the delete prohibit attribute belonging to another user that may connect another PC 400 and another camera 200 to the wireless transmitter 300 upon restoration of communication. An example of processing that may be executed by the wireless transmitter 300 to autonomously clear the delete prohibit attribute from image files and then reassign the delete prohibit attribute is now described in reference to FIG. 8.

Figure 8:
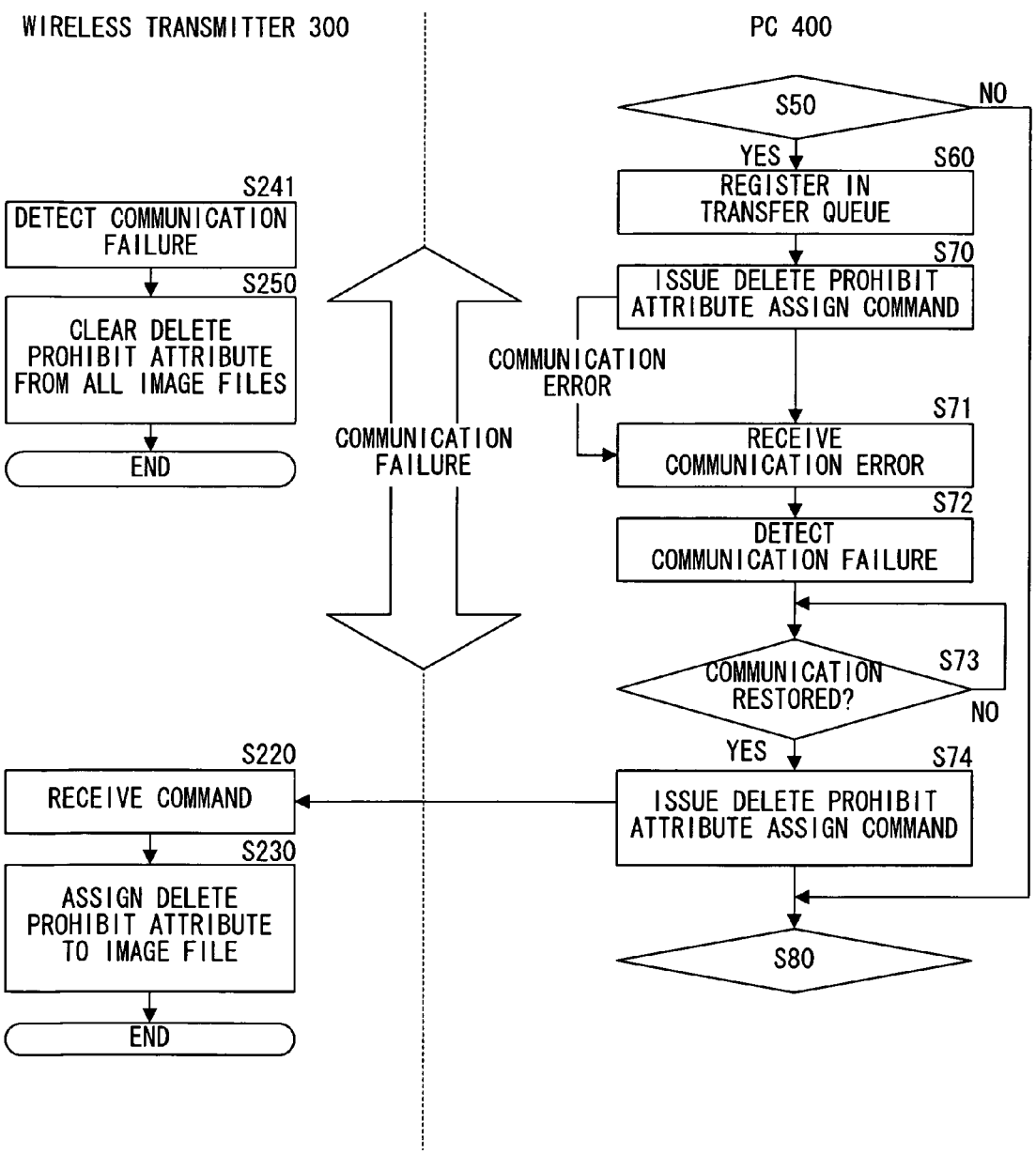
FIG. 8 presents a flowchart of part of the processing executed in the wireless transmitter 300 and the PC 400 as a delete prohibit attribute assign command for the wireless transmitter 300, issued from the PC 400, is returned in an error.

FIG. 8 presents a flowchart of part of the processing that may be executed in the wireless transmitter 300 and the PC 400 when a delete prohibit attribute assign command for the wireless transmitter 300 is returned in an error. The same step numbers are assigned to steps in FIG. 8 in which processing identical to that in FIG. 5 is executed. In addition, FIG. 8 does not include the processing flows prior to step S50 and following step S80.

In step S70, the CPU 405 in the PC 400 issues a delete prohibit attribute assign command to the wireless transmitter 300 as a form of an instruction for assigning the delete prohibit attribute to the image file bearing a file name registered in the transfer queue. If a communication failure has occurred in the communication between the wireless transmitter 300 and the PC 400, the delete prohibit attribute assign command having been issued as described above shall be returned in an error and, in such a case, the CPU 405 receives the communication error in step S71 and detects the communication failure in step S72. In step S73, the CPU 405 waits in standby for restoration of the communication.

In the event of a communication failure occurring in the communication between the wireless transmitter 300 and PC 400, the CPU 304 in the wireless transmitter 300 detects the communication failure in step S241 and then in step S250, it clears the delete prohibit attribute from all the image files assigned with the delete prohibit attribute in a batch before ending the processing.

Once the communication is restored, the CPU 405 in the PC 400 reissues a delete prohibit attribute assign command in step S74 before the operation proceeds to step S80.

After detecting the communication failure in step S241 as described above, the batch-clearance of the delete prohibit attribute may be executed in step S250 if the communication is not restored within a guard time duration upon regarding a permanent failure. If the communication is restored within the guard time duration upon regarding the permanent failure, the communication failure having been detected in step S241 is determined to be a temporary communication failure and, accordingly, the operation skips the batch-clearance of the attribute in step S250 and ends the processing.

The attribute assign command may be issued in step S74 as described above if a communication failure is not detected during a guard time duration upon regarding a failure recovery while waiting in standby for the restoration of the communication in step S73. If a communication failure is detected during the guard time duration upon regarding the failure recovery, the communication failure having been detected in step S72 is a permanent communication failure and accordingly, the operation continuously waits in standby for the restoration of the communication in step S73.

The length of the guard time duration upon regarding the permanent failure and the length of the guard time duration upon regarding the failure recovery may be equal to each other or different from each other. The length of the guard time duration upon regarding the permanent failure and the length of the guard time duration upon regarding the failure recovery may be each set in advance to a default value or may assume a setting that can be adjusted by the user.

(7) In variation (6) described above, the CPU 304 in the wireless transmitter 300 autonomously clears the delete prohibit attribute from the image files currently assigned with the delete prohibit attribute in the event of a communication failure occurring in the communication between the wireless transmitter 300 and the PC 400. As an alternative, a delete prohibit attribute clear command may be uniformly issued from the CPU 405 in the PC 400 to the wireless transmitter 300 following restoration of communication.

In this case, even in the event of, for instance, an intermittent communication failure, a mismatch of the operating states that the wireless transmitter 300 and the PC 400, which may result from the CPU 304 in the wireless transmitter 300 receiving a delete prohibit attribute clear command from the PC 400 but failing to send an acknowledgment of the reception to the PC 400, does not occur. In other words, as soon as communication is restored, the operating state at the CPU 405 in the PC 400 is immediately coordinated with the operating state at the wireless transmitter and an image file recorded in the flash memory 305 can be transferred to the PC 400 without an error, ensuring a high level of processing reliability. In reference to FIG. 9, an example of processing that may be executed to uniformly issue a delete prohibit attribute clear command from the CPU 405 in the PC 400 to the wireless transmitter 300 is now described.

Figure 9:
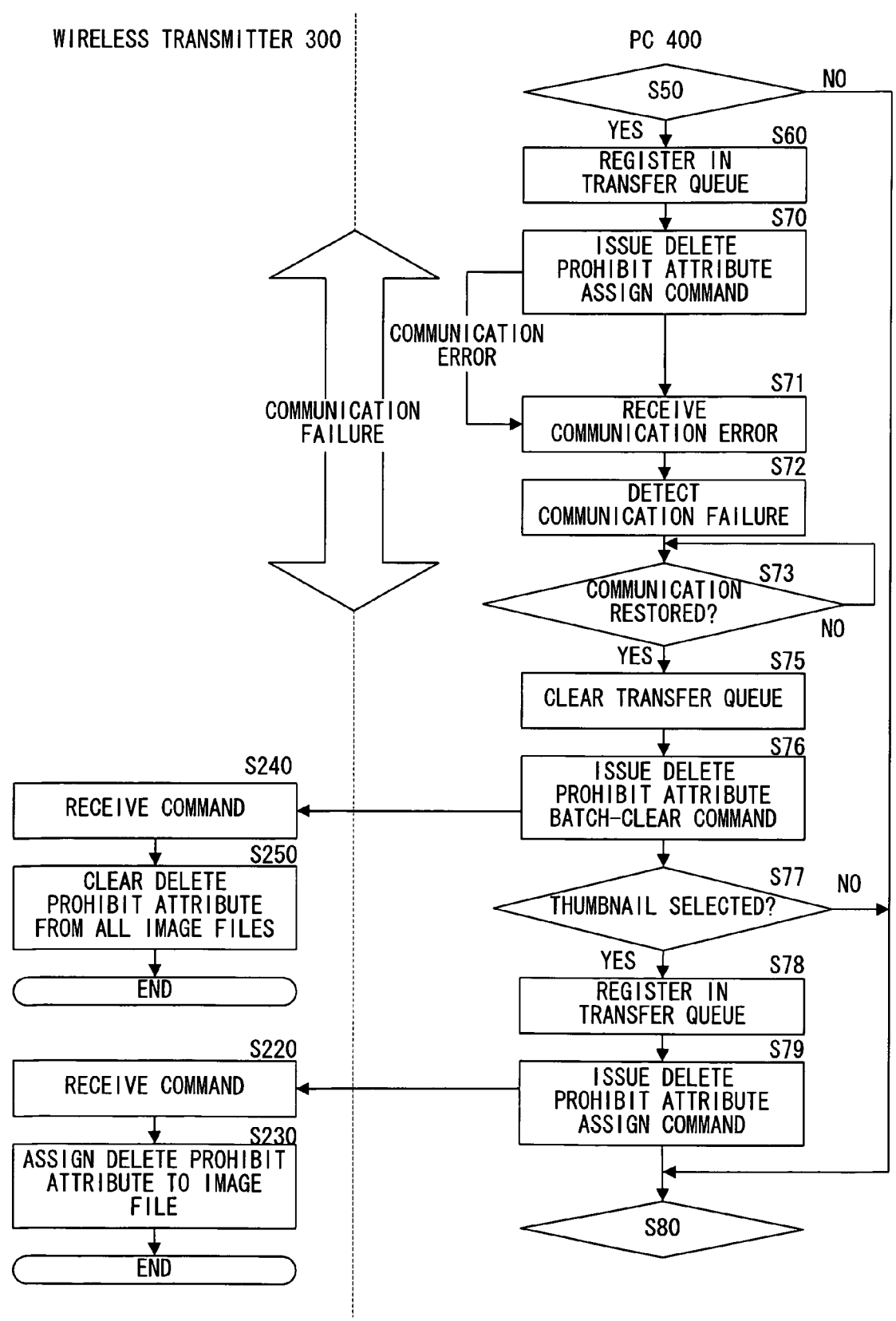
FIG. 9 presents a flowchart of part of the processing executed in the wireless transmitter 300 and the PC 400 as a delete prohibit attribute assign command for the wireless transmitter 300, issued from the PC 400, is returned in an error.

FIG. 9 presents a flowchart of part of the processing that may be executed in the wireless transmitter 300 and the PC 400 when a delete prohibit attribute assign command for the wireless transmitter 300 is returned in an error. The same step numbers are assigned to steps in FIG. 9, in which processing identical to that in FIG. 5 is executed. In addition, FIG. 9 does not include the processing flows prior to step S50 and following step S80.

In step S70, the CPU 405 in the PC 400 issues a delete prohibit attribute assign command to the wireless transmitter 300 as a form of an instruction for assigning the delete prohibit attribute to the image file bearing a file name registered in the transfer queue. If a communication failure has occurred in the communication between the wireless transmitter 300 and the PC 400, the delete prohibit attribute assign command having been issued shall be returned in an error and, in such a case, the CPU 405 receives the communication error in step S71 and detects the communication failure in step S72. In step S73, the CPU 405 waits in standby for restoration of the communication.

Once the communication is restored, the CPU 405 in the PC 400 clears the transfer queue in step S75 and issues to the wireless transmitter 300 a delete prohibit attribute batch-clear command as a form of an instruction for batch-clearing the delete prohibit attribute from all the image files currently assigned with the delete prohibit attribute in step S76. In step S77, a decision is made as to whether or not a thumbnail image corresponding to the transfer target image file has been selected by the user via the operation member 401. If a negative decision is made in step S77, the operation proceeds to step S80. If an affirmative decision is made in step S77, however, the operation proceeds to step S78.

In step S78, the CPU 405 adds (registers) the filename of the image file corresponding to the thumbnail image having been selected by the user into the transfer queue, before the operation proceeds to step S79.

In step S79, the CPU 405 issues to the wireless transmitter 300 a delete prohibit attribute assign command as a form of an instruction for assigning the delete prohibit attribute to the image file bearing the filename having been registered in the transfer queue. The operation subsequently proceeds to step S80.

Upon receiving in step S240 the delete prohibit attribute batch-clear command from the PC 400, the CPU 304 in the wireless transmitter 300 clears the delete prohibit attribute from all the image files assigned with the delete prohibit attribute in a batch based upon the received command in step S250 before ending the processing.

Upon receiving in step S220 the delete prohibit attribute assign command from the PC 400, the CPU 304 assigns the delete prohibit attribute to the image file indicated by the PC 400 based upon the received command in step S230 before ending the processing.

(8) In variation (6) described above, the CPU 304 in the wireless transmitter 300 autonomously clears the delete prohibit attribute from the image files currently assigned with the delete prohibit attribute in the event of a communication failure occurring in the communication between the wireless transmitter 300 and the PC 400. However, provided that the CPU 208 in the camera 200 is also capable of issuing a delete prohibit attribute assign command to the wireless transmitter 300, the delete prohibit attribute may be cleared only from the image files assigned with the delete prohibit attribute in response to delete prohibit attribute assign commands issued from the CPU 405 in the PC 400 among all the image files recorded in the flash memory 305 upon resumption of the communication.

Through these measures it is ensured that a delete prohibit attribute assigned to an image file to indicate that the image file is particularly important in response to a delete prohibit attribute assign command issued from the CPU 208 in the camera 200 to the wireless transmitter 300 based upon a specific user operation performed at the operation member 209 at the camera 200, is not autonomously cleared even if a temporary communication failure occurs between the wireless transmitter 300 and PC 400. As a result, once the communication is restored, the CPU 405 in the PC 400 is able to transfer the important image file recorded in the flash memory 305 to the PC 400 with a high level of reliability assuring a high level of processing functionality. In reference to FIG. 10, processing, which may be executed when the wireless transmitter 300 autonomously clears the delete prohibit attribute from image files having been assigned with the delete prohibit attribute based upon delete prohibit attribute assign commands issued by the PC 400, is described.

Figure 10:
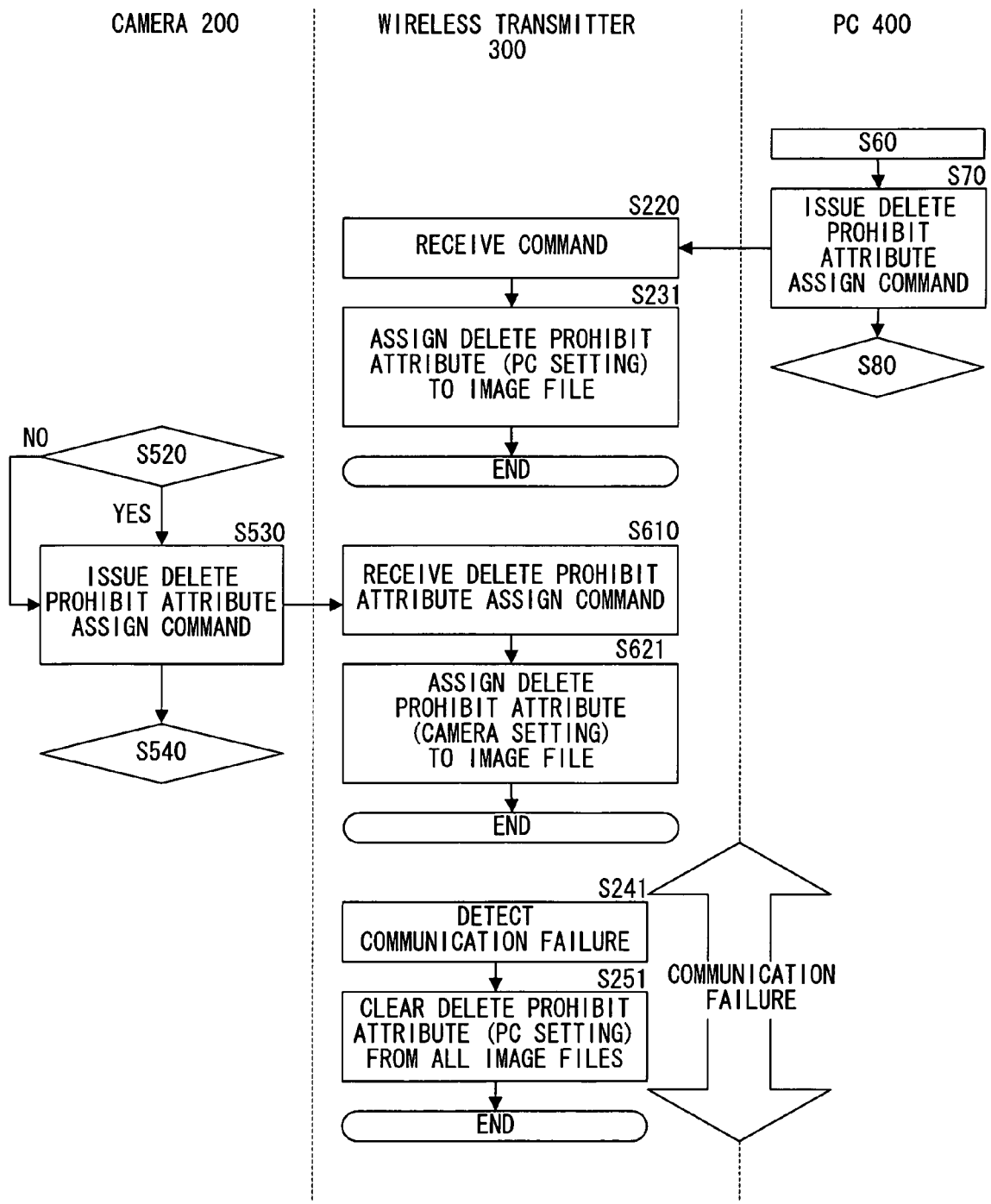
FIG. 10 presents a flowchart of part of the processing executed in the wireless transmitter 300 when a communication failure has occurred in the communication between the wireless transmitter 300 and the PC 400.

FIG. 10 presents a flowchart of part of processing that may be executed in the wireless transmitter 300 when a communication failure occurs in the communication between the wireless transmitter 300 and the PC 400, as shown in FIG. 8, after the CPU 304, having received the delete prohibit attribute assign command for the wireless transmitter 300 originating from the PC 400 in FIG. 5 or from the camera 200 in FIG. 7, assigns the delete prohibit attribute to an image file. The same step numbers are assigned to steps in the processing in FIG. 10 in which processing identical to that shown in FIGS. 5, 7 and 8 is executed. In addition, the flowchart does not include the processing flows prior to step S60 and following step S80 at the PC 400 and the processing flows prior to step S520 and following step S540 at the camera 200.

Upon receiving in step S220 a delete prohibit attribute assign command from the PC 400, the CPU 304 assigns the delete prohibit attribute (PC setting) to the image file indicated by the PC 400 based upon the received command in step S231 before ending the processing.

The CPU 304 receives a delete prohibit attribute assign command from the camera 200 in step S610. Subsequently, in step S621, the CPU 304 assigns the delete prohibit attribute (camera setting) to the image file bearing the filename indicated in the delete prohibit command among the image files recorded in the flash memory 305 and then ends the processing.

As a communication failure occurs in the communication between the wireless transmitter 300 and the PC 400, the CPU 304 in the wireless transmitter 300 detects the communication failure in step S241 and then clears in a batch the delete prohibit attribute from all the image files assigned with the delete prohibit attribute (PC setting) in step S251 before ending the processing.

(9) In reference to variation (8), the processing executed in step S241 and step S251 in the event of a communication failure in the communication between the wireless transmitter 300 and the PC 400 is described. As an alternative, the CPU 304 in the wireless transmitter 300 having received a delete prohibit attribute batch-clear command from the PC 400 in step S240 following the restoration of communication between the wireless transmitter 300 and the PC 400 in FIG. 9, may clear in a batch the delete prohibit attribute from all the image files assigned with the delete prohibit attribute (PC setting) in step S251 before ending the processing.

(10) While processing that may be executed in the event of a communication failure is described in reference to variations (6)~(9) above, the processing flows described above may adopted in a similar manner when an application busy state occurs at the wireless transmitter 300 or at the PC 400, as well.

The above described embodiments are examples, and various modifications can be made without departing from the scope of the invention.

What is claimed is:

1. An image transmission apparatus which transfers image files to an external image reception apparatus, comprising:
 a storage medium in which the image files are recorded;
 a deletion unit that deletes an image file recorded in the storage medium;
 an identifying unit that identifies an image file transmission, which has been requested by the external image reception apparatus;
 a prohibiting unit that prohibits the deletion unit from deleting the image file recorded in the storage medium in accordance with a transmission request by the external image reception apparatus, which has been identified by the identifying unit;
 a transmission control unit that reads the image file recorded in the storage medium, which has been identified by the identifying unit, and transmits the image file to the image reception apparatus;
 an interface unit via which an external camera is connected to the image transmission apparatus, and
 a detection unit that detects an image file transmission disabled state with regard to image file transmission to the image reception apparatus,
 wherein:
 if available capacity at the storage medium is smaller than a data size of an image file received from the external camera via the interface unit, the deletion unit deletes as many image files that are not delete-prohibited by the prohibiting unit, among image files recorded in the storage medium, as necessary to secure memory space in the storage medium greater than the data size;
 the prohibiting unit prohibits the deletion unit from deleting an image file for which the external camera has issued a delete prohibit instruction;
 the image files recorded in the storage medium include an image file for which the external camera has issued a delete prohibit instruction, an image file for which the image reception apparatus has issued a delete prohibit instruction and an image file deletion of which is not prohibited by the prohibiting unit; and
 as the detection unit detects the image file transmission disabled state, the prohibiting unit clears prohibition of deletion by the deletion unit of the image file for which the delete prohibit instruction has been issued by the image reception apparatus, without clearing prohibition of deletion by the deletion unit of the image file for which the delete prohibit instruction has been issued by the external camera.

2. An image reception apparatus which obtains an image file from an external image transmission apparatus, comprising:
 a requesting unit that registers an image file specified by a user into a queue used to manage an order in which the image file is to be transmitted and issues image file transmission requests to the external image transmission apparatus so that image files are transmitted in an order in which the image files are registered in the queue;
 a command transmission unit that transmits to the image transmission apparatus a delete prohibit command for prohibiting deletion of the image file having been registered into the queue by the requesting unit in response to an acquisition request for the image file in the external image transmission apparatus issued by the user; and
 a reception control unit that receives an image file from the image transmission apparatus.

3. An image reception apparatus according to claim 2, wherein:
 once reception of an image file is completed at the reception unit, the requesting unit deletes the image file from the queue; and
 the command transmission unit transmits a command for clearing prohibition of deletion of the image file to the image transmission apparatus.

4. An image reception apparatus according to claim 2, wherein:
 if the user cancels a transmission request for an image file, the requesting unit deletes the image file from the queue; and the command transmission unit transmits a command for clearing prohibition of deletion of the image file to the image transmission apparatus.

5. An image reception apparatus according to claim 2, further comprising:
- a detection unit that detects a command transmission enabled state and a command transmission disabled state with regard to command transmission to the image transmission apparatus, wherein:
- if the detection unit, having detected the command transmission disabled state, then detects the command transmission enabled state, the command transmission unit transmits a clear command for clearing prohibition of image file deletion to the image transmission apparatus.

6. An image reception apparatus according to claim 2, further comprising:
- a detection unit that detects a command transmission enabled state and a command transmission disabled state with regard to command transmission to the image transmission apparatus, wherein:
- if the detection unit, having detected the command transmission disabled state, then detects the command transmission enabled state, the command transmission unit transmits a command for reassigning prohibition of image file deletion to the image transmission apparatus.

7. An image transmission apparatus which transfers image files to an external image reception apparatus, comprising:
- a storage medium in which the image files are recorded;
- a deletion unit that deletes an image file recorded in the storage medium;
- an identifying unit that identifies an image file transmission, which has been requested by the external image reception apparatus;
- a prohibiting unit that prohibits the deletion unit from deleting the image file recorded in the storage medium in accordance with a transmission request by the external image reception apparatus, which has been identified by the identifying unit; and
- a transmission control unit that reads the image file recorded in the storage medium, which has been identified by the identifying unit, and transmits the image file to the image reception apparatus, wherein:

the image file contains main image data expressing a main image and thumbnail image data expressing a thumbnail image corresponding to the main image; and the identifying unit transmits the thumbnail image data for identifying the image file, transmission of which has been requested by the external image reception apparatus.

* * * * *